(12) United States Patent
Rahaman et al.

(10) Patent No.: US 9,448,087 B2
(45) Date of Patent: Sep. 20, 2016

(54) CONTACTLESS MAGNETIC LINEAR POSITION SENSOR

(75) Inventors: Azizur Rahaman, Oak Brook, IL (US); Seong-Jae Lee, Mount Prospect, IL (US)

(73) Assignee: METHODE ELECTRONICS, INC., Chicago, IL (US)

( * ) Notice: Subject to any disclaimer, the term of this patent is extended or adjusted under 35 U.S.C. 154(b) by 156 days.

(21) Appl. No.: 13/269,849

(22) Filed: Oct. 10, 2011

(65) Prior Publication Data

US 2013/0088218 A1 Apr. 11, 2013

(51) Int. Cl.
*G01B 7/14* (2006.01)
*G01D 5/14* (2006.01)

(52) U.S. Cl.
CPC ..................... *G01D 5/145* (2013.01)

(58) Field of Classification Search
CPC .... G01D 5/145; G01D 5/2046; G01D 5/147; G01B 7/003; G01B 7/14; F15B 15/2815
USPC ........................................ 324/207.24, 207.11
See application file for complete search history.

(56) References Cited

U.S. PATENT DOCUMENTS

| | | |
|---|---|---|
| 4,555,120 A * | 11/1985 | Frait et al. ............ 280/6.158 |
| 5,351,555 A | 10/1994 | Garshelis |
| 5,465,627 A | 11/1995 | Garshelis |
| 5,520,059 A | 5/1996 | Garshelis |
| 5,591,925 A | 1/1997 | Garshelis |
| 5,706,572 A | 1/1998 | Garshelis |
| 5,708,216 A | 1/1998 | Garshelis |
| 5,763,793 A | 6/1998 | Ng et al. |
| 5,802,479 A | 9/1998 | Kithil et al. |
| 5,817,952 A | 10/1998 | Swisher et al. |
| 5,837,908 A | 11/1998 | Ng et al. |
| 5,887,335 A | 3/1999 | Garshelis |
| D409,935 S | 5/1999 | Speckhart |
| 5,975,568 A | 11/1999 | Speckhart et al. |
| 6,014,025 A | 1/2000 | Cripe |
| 6,014,602 A | 1/2000 | Kilthil et al. |
| 6,047,605 A | 4/2000 | Garshelis |
| 6,145,387 A | 11/2000 | Garshelis |
| 6,220,105 B1 | 4/2001 | Cripe |
| 6,222,363 B1 | 4/2001 | Cripe |
| 6,260,423 B1 | 7/2001 | Garshelis |
| 6,275,146 B1 | 8/2001 | Kilthil et al. |
| 6,346,812 B1 | 2/2002 | May et al. |
| 6,360,841 B1 | 3/2002 | Blandino et al. |
| 6,411,081 B1 | 6/2002 | Spellman |
| 6,490,934 B2 | 12/2002 | Garshelis |
| 6,513,395 B1 | 2/2003 | Jones |
| 6,553,847 B2 | 4/2003 | Garshelis |
| 6,581,480 B1 | 6/2003 | May et al. |
| 6,655,471 B2 | 12/2003 | Cripe et al. |
| 6,698,299 B2 | 3/2004 | Cripe |

(Continued)

FOREIGN PATENT DOCUMENTS

| | | |
|---|---|---|
| WO | 0058704 | 10/2000 |
| WO | 03014757 | 2/2003 |

(Continued)

*Primary Examiner* — Bot Ledynh
(74) *Attorney, Agent, or Firm* — Blank Rome LLP

(57) ABSTRACT

In a position sensor, two field sensors are placed along a line parallel to the movement to be detected. Two magnets are placed at an angle to each other to generate a magnetic field such that their position is a linear or approximately linear function of the difference between the outputs of the sensors.

30 Claims, 4 Drawing Sheets

(56) References Cited

U.S. PATENT DOCUMENTS

| | | | |
|---|---|---|---|
| 6,761,229 B2 | 7/2004 | Cripe et al. | |
| 6,765,357 B2 | 7/2004 | Cripe et al. | |
| 6,776,057 B1 | 8/2004 | May | |
| 6,810,754 B2 | 11/2004 | May | |
| 6,826,969 B1 | 12/2004 | May | |
| 6,844,541 B2 | 1/2005 | Alsobrooks et al. | |
| 6,871,555 B2 | 3/2005 | May | |
| 6,904,814 B2 | 6/2005 | May | |
| 6,910,391 B1 | 6/2005 | May | |
| 6,956,198 B2 | 10/2005 | Alsobrooks et al. | |
| 6,959,612 B2 | 11/2005 | May | |
| 6,997,065 B2 | 2/2006 | May | |
| 7,088,095 B1 | 8/2006 | Busch | |
| 7,117,752 B2 | 10/2006 | May | |
| 7,124,649 B2 | 10/2006 | May | |
| 7,140,258 B2 | 11/2006 | May | |
| 7,219,564 B1 | 5/2007 | May | |
| 7,237,443 B2 | 7/2007 | Speckhart et al. | |
| 7,268,536 B2 | 9/2007 | Hagino et al. | |
| 7,283,826 B2 * | 10/2007 | Dufour et al. | 455/456.1 |
| 7,302,867 B2 | 12/2007 | May | |
| 7,305,882 B1 | 12/2007 | May | |
| 7,317,392 B2 | 1/2008 | DuRocher | |
| 7,521,923 B2 | 4/2009 | May et al. | |
| 7,699,118 B2 | 4/2010 | Setter et al. | |
| 7,843,190 B2 * | 11/2010 | Nishida et al. | 324/207.2 |
| 8,087,304 B2 | 1/2012 | Lee | |
| 8,125,218 B2 | 2/2012 | Lackey | |
| 8,151,654 B2 | 4/2012 | Speckhart et al. | |
| 8,424,393 B1 | 4/2013 | Lee | |
| 8,578,794 B2 | 11/2013 | Lee | |
| 8,635,917 B2 | 1/2014 | Lee | |
| 8,779,306 B2 | 7/2014 | Gauthier et al. | |
| 8,836,458 B2 | 9/2014 | Lee | |
| 8,893,562 B2 | 11/2014 | Barraco et al. | |
| 9,046,430 B2 | 6/2015 | Moran et al. | |
| 9,086,460 B2 | 7/2015 | Rice et al. | |
| 2002/0027348 A1 | 3/2002 | Speckhart et al. | |
| 2004/0069071 A1 | 4/2004 | Speckhart et al. | |
| 2005/0184496 A1 | 8/2005 | Speckhart et al. | |
| 2006/0164074 A1 * | 7/2006 | Andrieu et al. | 324/207.13 |
| 2006/0250029 A1 | 11/2006 | Kelly et al. | |
| 2007/0103104 A1 | 5/2007 | May | |
| 2007/0114990 A1 * | 5/2007 | Godkin | 324/207.24 |
| 2009/0107257 A1 | 4/2009 | May | |
| 2009/0121708 A1 * | 5/2009 | Lackey | 324/207.2 |
| 2009/0256553 A1 * | 10/2009 | Dmytriw et al. | 324/207.21 |
| 2010/0018328 A1 | 1/2010 | May | |
| 2010/0085041 A1 | 4/2010 | Pozidis et al. | |
| 2010/0301846 A1 | 12/2010 | Lee | |
| 2010/0308805 A1 * | 12/2010 | Stuve | 324/207.24 |
| 2012/0166046 A1 | 6/2012 | Speckhart et al. | |
| 2012/0194198 A1 | 8/2012 | Moran | |
| 2012/0316814 A1 | 12/2012 | Rahaman et al. | |
| 2013/0088218 A1 | 4/2013 | Rahaman et al. | |
| 2015/0204737 A1 | 7/2015 | Moran et al. | |
| 2015/0276520 A1 | 10/2015 | Ursetta et al. | |

FOREIGN PATENT DOCUMENTS

| | | |
|---|---|---|
| WO | 2004029569 | 4/2004 |
| WO | 2004074787 | 9/2004 |
| WO | 2004113844 A2 | 12/2004 |

* cited by examiner

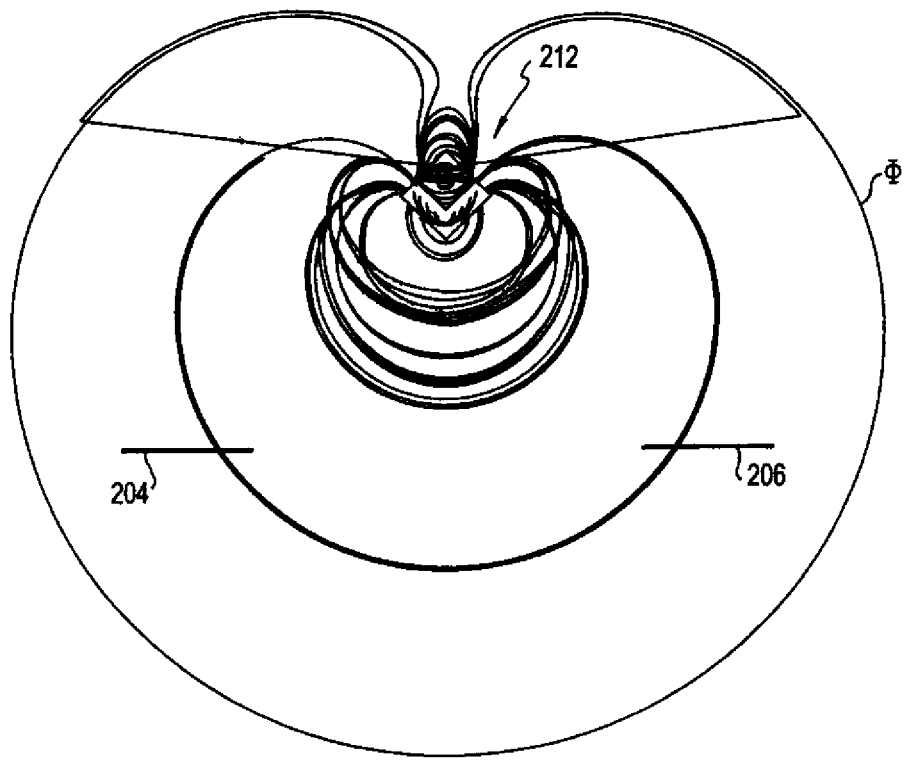
FIG. 2B
FIG. 5
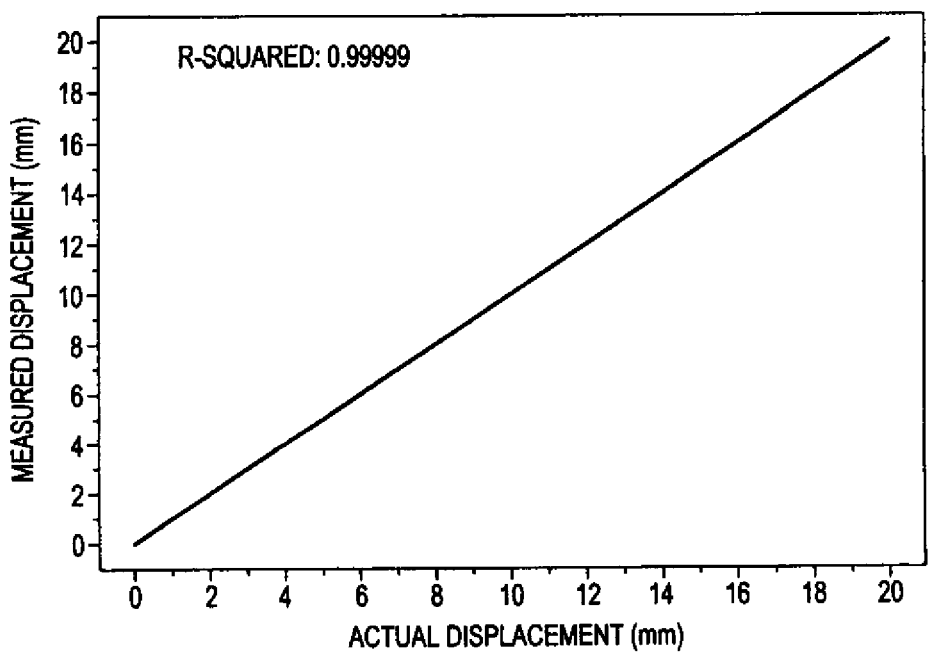

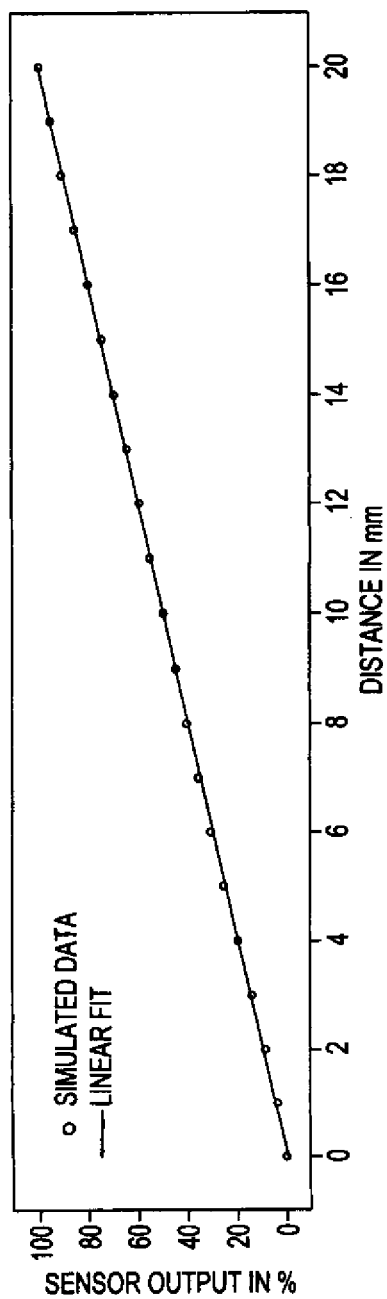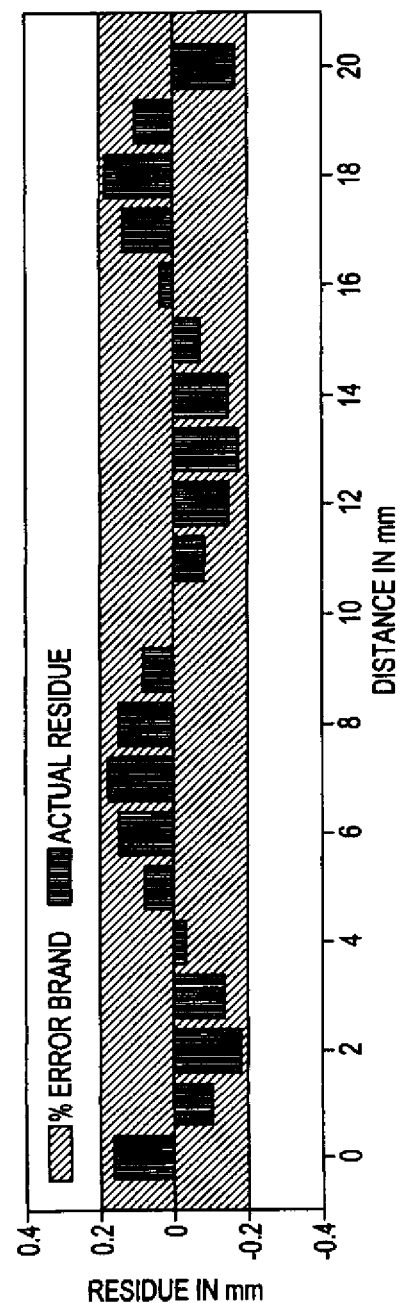

CONTACTLESS MAGNETIC LINEAR POSITION SENSOR

BACKGROUND OF THE INVENTION

1. Field of the Invention

The present invention is directed to magnetic position sensors, such as linear position sensors, and more particularly to such sensors having a plurality of magnets configured to generate a signal that varies with a position of the magnets.

2. Description of Related Art

Contactless position sensors are widely known in the art. One kind of contactless sensor uses a magnet attached to a component whose position is to be measured, with a magnetic field sensor at a fixed location, or vice versa, to detect the magnetic field produced by the attached magnet. The sensor measures the magnetic field strength at the location of the sensor, and the detected field strength is used to calculate the location of the magnet. However, the location is not a linear function of the measured field strength, so that the calculation is complicated.

To overcome that difficulty, some position sensors use more than two magnets, a complex shape, or one or two larger magnets, as large as half the range of the distance to be measured, in order to modify the magnetic flux lines to obtain a linear response with the distance. For example, U.S. Pat. No. 7,088,095 uses one or two magnets of complex shapes, and a Hall sensor measures the orthogonal component of the field. The magnets' dimension is as large as the distance range to be measured.

U.S. Pat. No. 7,268,536 uses two magnets arranged such to produce uniform field in the detection region, and a magnetoelectric transducer provides the position measurement. The dimension of the two magnets is as large as half the distance range to be measured. Other prior art devices require flux directors to modify the magnetic field or flux lines from the magnets to obtain as close to a linear output as possible.

What is needed, therefore, is an instrument, system, and method for measuring the distance an object traverses that addresses the deficiencies in the prior art magnetic devices, one that is relatively compact, easy to manufacture, and outputs a substantially linear signal, and does not require flux directors, and also can operate in various high temperature, high humidity, and high vibration environments.

SUMMARY OF THE INVENTION

It is a principal object of the present invention to provide a linear position sensor having magnets, magnetic field sensors, and logic circuits whereby the shape and/or arrangement of two or more magnets produces a magnetic flux density and magnetic field in the regions of the magnetic field sensors that is substantially uniform, thereby producing a linear or approximately linear response from the magnetic field sensors as the two or more magnets move relative to the magnetic field sensors.

It is another object of the present invention to provide a system and method for detecting the linear relative movement of an object using magnets and magnetic field sensors that do not contact one another. Thus, in one example of the invention, two magnets are arranged in such a way to modify the magnetic field or flux density in the detection region such that the difference in the magnetic fields measured at the start- and end-points of the travel path of the magnets is linear with the distance of travel. The magnets are attached to the part of which we seek to locate the position, and the magnetic field sensors are fixed, or vice versa. As the magnets and field sensors are not attached to each other, the instrument is a contactless magnetic linear position sensor.

It is still another object of the present invention to provide a system and method for detecting the relative position of an object in space. In the present invention, the magnetic field sensor output is the difference between the magnetic fields measured at the start- and end-points of the travel path of the object, and it has a linear dependency on the distance or movement of the magnets from the start-point. By measuring the sensor output, the distance or the location of the magnets can be obtained relative to another location, and hence the instrument works as a linear position sensor.

The two magnets are arranged or directed in a way to produce field or flux lines in the region of the magnetic field sensors such that when the magnets are moved linearly the difference in the fields measured at the field sensor positions has a linear relationship with the distance or the movement of the magnets.

It is another object of the present invention to use magnets oriented in a pre-determined angle relative to each other. The angle between the magnetic directions of the two magnets is preferably 90 degrees, but it can be adjusted depending on (i) the surrounding materials, (ii) the distance between the magnetic field sensors, and (iii) the distance between the magnetic field sensors' axis and the travel path of the magnetic field sensors or the magnets. The strength of the magnets can be changed depending on the requirement of resolution on the distance measurement or on the requirement of overall linear position sensor resolution.

It is still another object of the present invention to provide a system and method in which the magnets are fixed in space and the magnetic field sensors move relative to the magnets. Thus, instead of attaching the magnets in the moving object, the magnets could be at fixed locations, and multiple sets of two field sensors could be attached to the moving object or objects. The use of two or more fixed magnets and multiple magnetic field sensors attached to moving parts provides the locations of multiple parts, depending on the specific use of the instrument.

It is another object of the present invention to provide small components for ease of use in tight locations and to reduce costs. In the case of the present invention, the magnets are typically small (e.g., 3 mm long and 2 mm diameter) compared to the range of distance (e.g., 20 mm) to be measured. The shape of the magnets is preferably cylindrical or rod-shaped, which is easy to manufacture. Alternatively, more complex geometrical magnets could be used to further linearize the sensor output. The cross section can be, e.g., square, rectangular, circular, elliptical, or triangular.

It is another object of the present invention to provide a linear position sensor having two field sensors placed at the end points of the travel path of an object. This is fundamentally different from any prior art in that the difference in the magnetic field or flux lines detected at the start- and end-points is linear with the distance traveled by the object. The final output is obtained from the difference in field detected by two sensors. As a result, any contribution to measurement due to an ambient field is automatically canceled out.

The present invention can be applied to any device moving linearly, such as a transmission clutch, in which a precise measurement of position is needed. It can be used in braking to determine the amount of force applied. It can be used in an angular sensor in which the angular movement is small compared to the radius of curvature, since in that case the angular movement at the outer periphery of the rotating object can be approximated as a linear movement. The sensor can also be used in a piston of an engine.

Some exemplary embodiments of the present invention may be used to detect a linear displacement of an object up to about 20 mm. The present invention may be scalable to measure linear displacements of an object to multiples of 20 mm by combining the use of multiple linear position such sensors placed in series.

The magnets can be attached in place using an adhesive such as glue. Welding is not preferred but may also be used.

For improved measurement sensitivity and accuracy, the relative positions of each of the magnets in a pair of magnets (i.e., the angle between them) can be changed as the moving object moves along a trajectory. That is, the angle between the magnets may range from less than 90-degrees to greater than 90-degrees as the object passes from one end-point to another end-point along a known path.

The magnetic field sensors according to the present invention may be flux-gate, Hall, or any other suitable magnetic field sensors.

The angle between the magnets is preferably 90 degrees, although that can be adjusted based on the application in which the instrument is to be used. In applications in which a nearby material may distort the magnetic field, either the angle can be adjusted, or an adjustment can be applied to the output of the magnetic field sensors.

The processing of the output signal by the logic circuits may involve compensating for temperature, other environmental, or device-specific factors.

In the preferred embodiment, the magnets are preferably two rods or cylinders. Alternatively, a dumbbell shape magnet can be used, and the magnets may be encased in plastic to protect them from the environment in which the instrument will operate.

BRIEF DESCRIPTION OF THE DRAWINGS

A preferred embodiment of the invention will be set forth in detail with reference to the drawings, in which:

FIG. 2B is a schematic drawing showing magnetic flux lines from the sensor of FIG. 2A;

FIG. 3A is a drawing of a plot showing simulated data from a sensor according to the present invention;

FIG. 3B is a drawing of a plot showing the residue of the data of FIG. 3A;

FIG. 5 is drawing of a plot showing the linearity of the measurement taken from the sensor according to the present invention.

DETAILED DESCRIPTION OF THE PREFERRED EMBODIMENT

Figure 1:
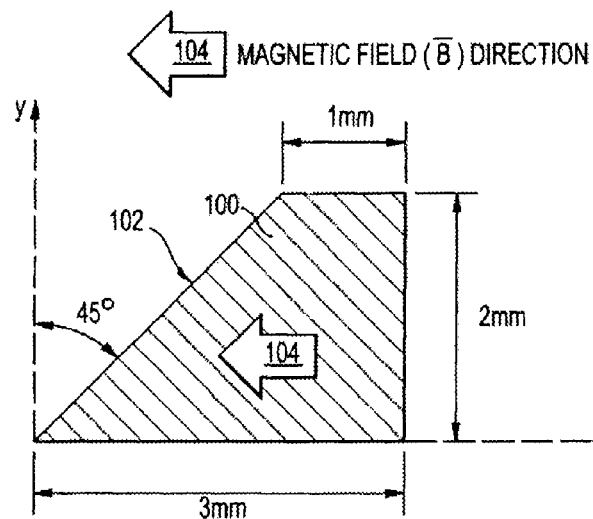
FIG. 1 is a schematic drawing showing a magnet according to one embodiment of the present invention.

Several preferred embodiments of the invention are described for illustrative purposes, it being understood that the invention may be embodied in other forms not specifically shown in the drawings. The figures will be described with respect to the system structure and methods for using the system to achieve one or more of the objects of the invention. In the drawings, like reference numerals refer to like elements throughout.

Turning first to FIG. 1, shown therein is a magnet 100 according to the preferred embodiment of the present invention aligned with a magnetic field B exhibiting a magnetic field direction 104. The magnet 100 may be formed from a wire having a diameter of about 2 millimeters. The wire may be cut such that it has a face 102 that is at about a 45-degree angle relative to the longitudinal axis (x-direction) of the magnet 100. The magnet 100 may have a maximum length of about 3 millimeters measured along the longitudinal direction, and a minimum length of about 1 millimeter measured along the longitudinal direction, as shown in FIG. 1. The wire, and thus the magnet 100, may have a circular cross section, but other cross sections may also be used, such as, for example, an oval or other non-circular cross section. It is not required that the cross-section diameter be the same along the entire length of the magnet in the longitudinal direction. Some variation is expected and allowable in the material used to make the magnet 100.

Preferably, the magnet 100 is made of a homogeneous material, either crystalline or amorphous, or a combination of crystalline and amorphous materials, that is capable of being permanently magnetized and thus the magnet 100 should possess a remanent magnetization. The strength of the magnetic field produced by the magnet 100 in a quiescent state will become readily apparent from the following disclosure. The minimum magnetic field that is potentially detectable depends on the type and resolution of magnetic field sensors 204, 206, and the strength of the magnetic flux/field.

Figure 2A:
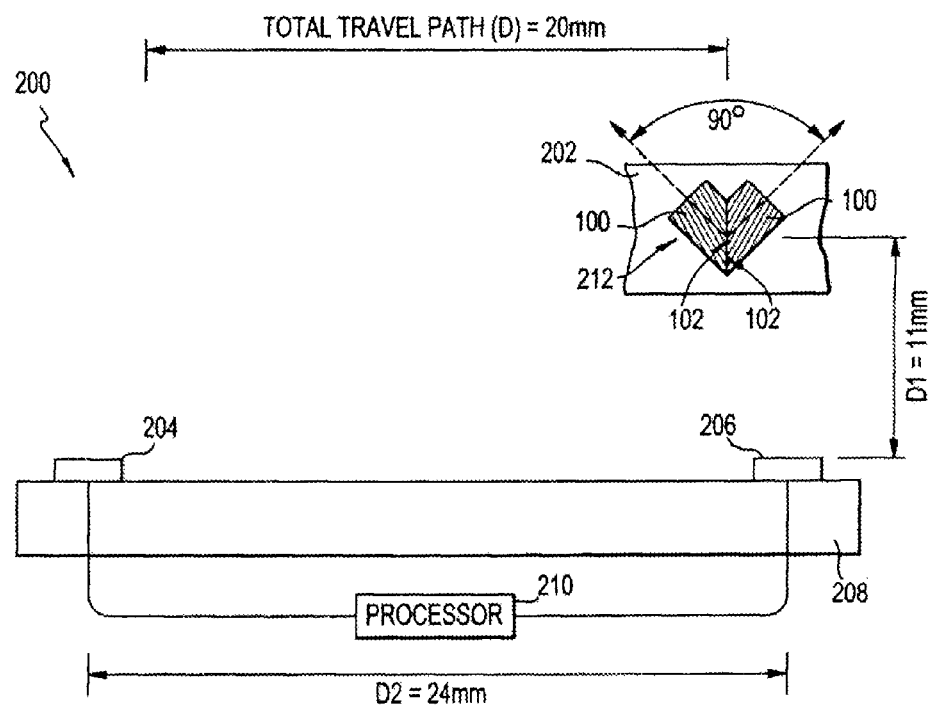
FIG. 2A is a schematic drawing showing a sensor according to one embodiment of the present invention having a pair of the magnets shown in FIG. 1.

Turning now to FIG. 2A shown therein is a schematic drawing showing a linear position sensor system 200 according to one embodiment of the present invention, having two magnets 100 forming a magnet pair 212. The linear position sensor system 200 also includes an optional movable object body 202, two magnetic field sensors 204, 206, a substrate 208, and a signal processor circuit 210.

The individual magnets 100 are positioned proximate to each other. Preferably, the individual magnets 100 are attached to each other at their faces 102 such that their respective longitudinal axes form an angle of about 90 degrees relative to each other. It is also possible that a single L-shaped magnet could be used as long as it is magnetized in a manner such that it has the same magnetic flux-generating properties as the magnet pair 212. The magnet pair 212 is mounted on the optional movable body 202. The movable body 202 may be attached to a moveable component of another system. Alternatively, the movable component of the system in which the linear position sensor system 200 is used may be modified such that the magnet pair 212 is attached directly to the movable component. The movable body 202 and/or the component of the system to which the magnet pair 212 is attached, may follow a substantially linear travel path having a travel distance, D, of about 20 millimeters, as shown in FIG. 2A.

The two magnetic field sensors 204, 206 are preferably positioned about 24 mm apart and attached to a substrate 208, such as a steel block or on a PCB. The two magnetic field sensors 204, 206 are positions on a line substantially parallel to the direction of movement of the magnet pair 212. The substrate/steel block 208, and hence the magnetic field sensors 204,206, are approximately 11 millimeters from the movable body 202 and/or the magnet pair 212. Thus, there is no physical contact between the field generating and the field sensing portions of the linear position sensor system 200 as they move substantially parallel to each other.

To measure movements greater than about 20 millimeters, additional magnet pairs and magnetic field sensors can be added to the instrument. For example, two magnet pairs 212 could be spaced apart and mounted on a movable body 202 in a line parallel to the intended direction the movable body 202 will traverses. Additional magnetic field sensors could be added to the substrate 208 in a line that is parallel to the line of magnet pairs.

The processor 210, which is connected to and receives the electrical signals outputted by the magnetic field sensors 204, 206, calculates the displacement of the magnet pair 212 and/or the movable body 202 using logic circuits well know to those of ordinary skill in the art. For example, generally one could use a circuit in which the two independent magnetic field sensors 204, 206 each output a signal and the circuit obtains a difference between the outputted signals. The logic circuits could be part of a printed circuit board suitable for placement where needed by a specific application of the device.

Turning now to FIG. 2B, shown therein is a diagram showing the magnetic field sensors 204, 206 and the magnetic flux lines Φ that would be generated by the two magnets 100 of the magnet pair 212.

Turning now to FIG. 3A, shown therein is a drawing of a plot showing simulated data from a linear position sensor system 200 according to the present invention. As seen in the figure, a linear fit can be made to the data, with a residue, measured in millimeters, at each data point within an error band of plus or minus about 1 percent. Thus, the linear position sensor system 200 could be calibrated by fitting a line to actual data from the system 200, and then the calibration equation may be used with the output signals from the magnetic field sensors 204, 206 to generate an output signal equivalent to distance from the linear position sensor system 200.

In practice, each of the magnetic field sensors 204, 206 outputs a voltage according to the magnetic field it detects. The distance the magnet pair 212 or the movable object 202 to which the magnet pair 212 is attached can be estimated by entering the difference in the voltage outputted by the magnetic field sensor 204 and the magnetic field sensor 206 into the straight-line calibration equation (using, for example, a logic circuit), which then outputs a value representing the distance the magnet pair 212 or the movable object 202 moved, within an error of, in the example above, about 1 percent.

Figure 4A:
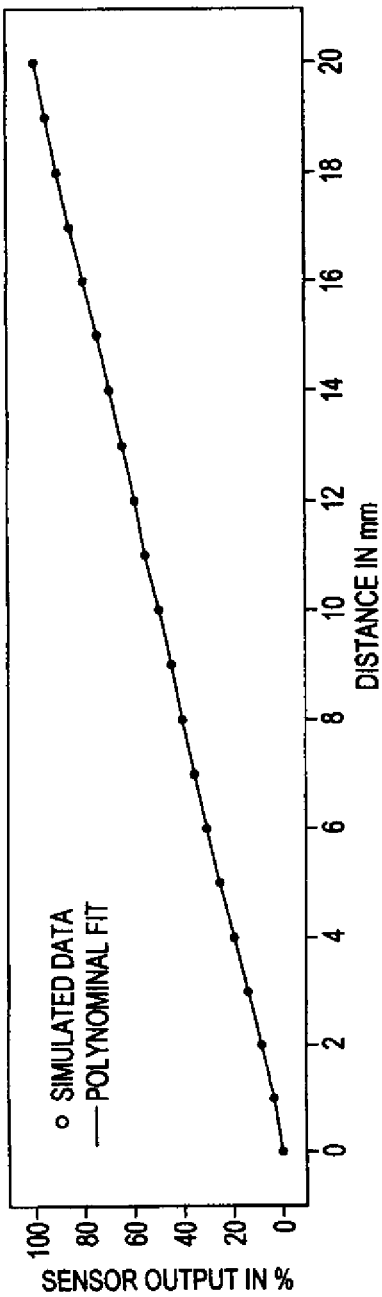
FIG. 4A is a drawing of a plot showing simulated data from a sensor according to the present invention.
Figure 4B:
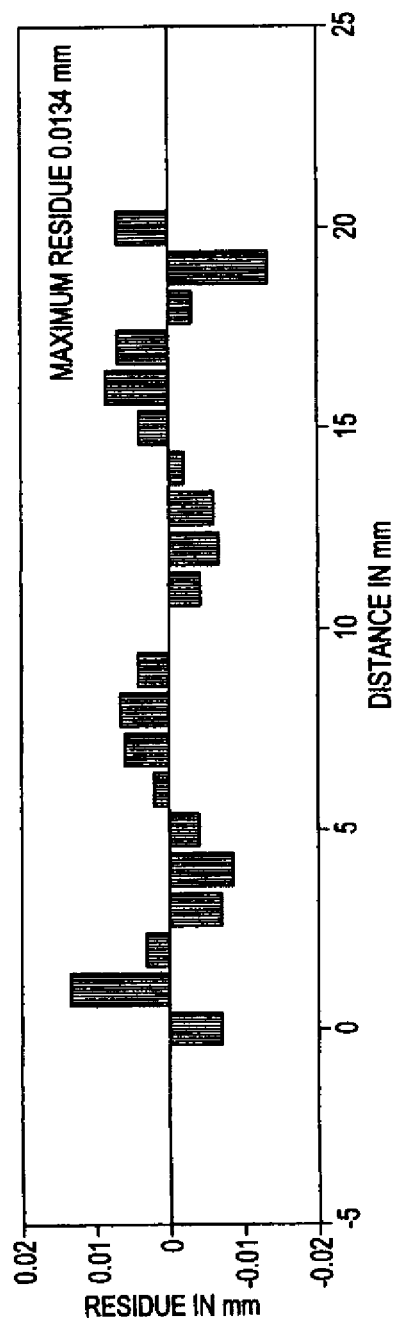
FIG. 4B is a drawing of a plot showing the residue of the data of FIG. 4A.

Turning now to FIG. 4A, shown therein is another drawing of a plot showing simulated data from a linear position sensor system 200 according to the present invention. Compared to FIG. 3A, the linear position sensor system 200 in FIG. 4A is designed using a polynomial fit of the calibration data instead of using a linear fit like that shown in FIG. 3A. More specifically, a fifth-order polynomial could be used and provides an error of plus or minus 0.0134 millimeters, as shown in FIG. 4B. Thus, the distance the magnet pair 212 or the movable object 202 to which the magnet pair 212 is attached can be estimated by entering the difference in the voltage outputted by the magnetic field sensor 204 and the magnetic field sensor 206 into the polynomial calibration equation described above, which then outputs a value representing the distance the magnet pair 212 or the movable object 202 moved, within an error of, in the present example, about plus or minus 0.0134 millimeters.

An N-points calibration can also be performed to obtain a straight line calibration line. A correction equal to the residue value can be applied to the distance calculated based on the straight-line fit equation. This procedure can also reduce the error to a negligible value.

The linear position sensor system 200 as a whole may operate with or without flux directors at or near the magnetic field sensors 204, 206. Flux directors (not shown) can be used to channel flux toward magnetic field sensors 204, 206 to enhance the signal. The linear position sensor system 200 may also employ a shield or other technique known in the art to compensate for ambient magnetic fields from near or far sources as necessary.

The present invention has many uses, including those described previously. In one example of the invention, the magnet pair 212 may be attached to (or embedded in) a piston of a motor, rod, or other movable member of an automotive passenger vehicle or off-road utility vehicle.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. For example, the magnet pair 212 may be stationary, while the magnetic field sensors are mounted on or within a moving object. Also, if a single magnet is used, the linearity may not be present, but the cancellation of ambient magnetic flux will still be accomplished. Accordingly, it is intended that the invention be limited only to the extent required by the appended claims and the applicable rules of law. The present invention should be construed as limited only by the claims appended to any patent application claiming the benefit of the present application or to any patent issuing therefrom.

We claim:

1. A sensor system for outputting an electrical signal representing an amount of relative movement, comprising:
   at least two magnetic field sensors;
   at least two magnets, each magnet having a longitudinal axis aligned with a magnetic field direction exhibited by the magnet and each magnet having a face at about a 45 degree first angle relative to the longitudinal axis, wherein the angled faces of the two magnets are positioned proximate to each other such that the two magnets in proximity to each other form a magnetic pair, and such that the two magnets define an second angle therebetween, wherein the second angle is measured relative to the respective longitudinal axes of the two magnets, and wherein the two magnets and the at least two magnetic field sensors are mounted for relative movement therebetween such that the two magnets and the at least two magnetic field sensors do not contact one another; and
   a circuit for determining an amount of the relative movement as a function of a difference between the outputs of the at least two magnetic field sensors.

2. The sensor system of claim 1, wherein the second angle is about 90 degrees measured relative to the respective longitudinal axes of the two magnets.

3. The sensor system of claim 1, wherein the two magnets are configured to changing the second angle therebetween from less than about 90 degrees to greater than about 90 degrees.

4. The sensor system of claim 1, wherein the function is a linear function.

5. The sensor system of claim 1, wherein the at least two magnetic field sensors are spaced apart and attached to a substrate.

6. The sensor system of claim 5, wherein the substrate is movable or fixed.

7. The sensor system of claim 1, wherein the two magnets in proximity to each other are attached to a movable object.

8. The sensor system of claim 1, wherein the at least two magnetic field sensors are spaced apart and attached to a movable substrate, and wherein the two magnets are attached to a movable object, and wherein both the substrate and the object are movable relative to each other.

9. The sensor system of claim 1, wherein the at least two magnetic field sensors, the two magnets, and the circuit are used in an automotive passenger vehicle.

10. A method for determining an amount of relative movement, comprising the steps of:
providing at least two magnetic field sensors for attachment to a substrate;
providing at least two magnets, each magnet having a longitudinal axis aligned with a magnetic field direction exhibited by the magnet and each magnet having a face at about a 45 degree first angle relative to the longitudinal axis, for attachment to an object, wherein the angled faces of the two magnets are positioned proximate to each other such that the two magnets in proximity to each other form a magnetic pair, and such that the two magnets define an second angle therebetween, wherein the second angle is measured relative to the respective longitudinal axes of the two magnets, and wherein the two magnets and the at least two magnetic field sensors are mounted for relative movement therebetween such that the two magnets and the at least two magnetic field sensors do not contact one another;
providing a circuit for receiving an output signal from each of the at least two magnetic field sensors for determining the relative movement as a function of a difference between the output signals of the at least two magnetic field sensors.

11. The method of claim 10, further comprising the step of determining the function using calibration data.

12. The method of claim 10, further comprising the step of outputting a signal representing the current location of one or both of the at least two magnetic field sensors, the two magnets, the object, or the substrate.

13. The method of claim 10, further comprising the step of determining the distance traveled by one or both of the at least two magnetic field sensors, the two magnets, the object, or the substrate.

14. The method of claim 10, wherein the second angle is about 90 degrees measured relative to the respective longitudinal axes of the two magnets.

15. The method of claim 10, wherein the two magnets in proximity to each other are configured to changing the second angle therebetween from less than about 90 degrees to greater than about 90 degrees.

16. The method of claim 10, wherein the function is a linear function.

17. The method of claim 10, wherein the at least two magnetic field sensors are spaced apart on the substrate.

18. The method of claim 10, wherein the substrate is movable or fixed.

19. The method of claim 10, wherein the at least two magnetic field sensors are spaced apart and attached to the movable substrate, and wherein the two magnets are attached to the object, and wherein both the substrate and the object are movable relative to each other.

20. The method of claim 10, wherein the at least two magnetic field sensors, the two magnets, and the circuit are used in an automotive passenger vehicle.

21. A sensor system for outputting an electrical signal representing an amount of relative movement, comprising:
at least two magnetic field sensors;
at least one single L-shaped magnet for attachment to an object, wherein the L-shaped magnet comprises two longitudinally-extending members forming an angle therebetween, wherein each member exhibits a magnetic field in a direction aligned with the longitudinal axis of the member, wherein the L-shaped magnet and the at least two magnetic field sensors are mounted for relative movement therebetween such that the L-shaped magnet and the at least two magnetic field sensors do not contact one another; and
a circuit for determining an amount of the relative movement as a function of a difference between the outputs of the at least two magnetic field sensors.

22. The sensor system of claim 21, wherein the function is a linear function.

23. The sensor system of claim 21, wherein the at least two magnetic field sensors are spaced apart and attached to a substrate.

24. The sensor system of claim 23, wherein the substrate is movable or fixed.

25. The sensor system of claim 21, wherein the L-shaped magnet is attached to a movable object.

26. The sensor system of claim 21, wherein the at least two magnetic field sensors are spaced apart and attached to a movable substrate, and wherein the L-shaped magnet is attached to a movable object, and wherein both the substrate and the object are movable relative to each other.

27. The sensor system of claim 21, wherein the at least two magnetic field sensors, the L-shaped magnet, and the circuit are used in an automotive passenger vehicle.

28. The sensor system of claim 5, wherein the substrate comprises one of a PCB and a steel block.

29. The method of claim 10, wherein the substrate comprises one of a PCB and a steel block.

30. The sensor system of claim 23, wherein the substrate comprises one of a PCB and a steel block.

* * * * *